United States Patent [19]
Celikkaya et al.

[11] Patent Number: 5,213,591
[45] Date of Patent: May 25, 1993

[54] ABRASIVE GRAIN, METHOD OF MAKING SAME AND ABRASIVE PRODUCTS

[76] Inventors: Ahmet Celikkaya; Jerald A. Scherger; Vernon M. Wald, all of P.O. Box 33427, St. Paul, Minn. 55133-3427

[21] Appl. No.: 920,728

[22] Filed: Jul. 28, 1992

[51] Int. Cl.$^5$ .............................................. B24D 3/00
[52] U.S. Cl. ................................ 51/293; 51/296; 51/307; 51/309
[58] Field of Search ............... 51/293, 296, 307, 308, 51/309

[56] References Cited

U.S. PATENT DOCUMENTS

| | | | |
|---|---|---|---|
| 1,528,543 | 3/1925 | Hartmann | 51/316 |
| 1,910,444 | 5/1933 | Nicholson | 51/308 |
| 2,314,340 | 3/1943 | Brown et al. | 51/295 |
| 3,029,160 | 4/1962 | Van Der Beck, Jr. | 117/100 |
| 3,269,815 | 8/1966 | Koopman | 51/308 |
| 4,249,913 | 2/1981 | Johnson et al. | 51/295 |
| 4,252,544 | 2/1981 | Takahashi | 51/309 |
| 4,278,449 | 7/1981 | Helletsberger et al. | 51/309 |
| 4,311,489 | 1/1982 | Kressner | 51/298 |
| 4,314,827 | 2/1982 | Leitheiser et al. | 51/298 |
| 4,472,173 | 9/1984 | Bruning et al. | 51/298 |
| 4,518,397 | 5/1985 | Leitheiser et al. | 51/293 |
| 4,623,364 | 11/1986 | Cottringer et al. | 51/309 |
| 4,652,275 | 3/1987 | Bloecher et al. | 51/298 |
| 4,734,104 | 3/1988 | Broberg | 51/309 |
| 4,737,163 | 4/1988 | Larkey | 51/295 |
| 4,744,802 | 5/1988 | Schwabel | 51/309 |
| 4,770,671 | 9/1988 | Monroe et al. | 51/293 |
| 4,881,951 | 11/1989 | Wood et al. | 51/293 |
| 4,913,708 | 4/1990 | Kalinowski | 51/295 |
| 4,964,883 | 10/1990 | Morris et al. | 51/293 |
| 4,997,461 | 3/1991 | Markhoff-Matheny et al. | 51/295 |
| 5,009,675 | 4/1991 | Kunz et al. | 51/295 |
| 5,011,508 | 4/1991 | Wald et al. | 51/293 |
| 5,042,991 | 8/1991 | Kunz et al. | 51/307 |
| 5,085,671 | 2/1992 | Martin et al. | 51/293 |
| 5,102,429 | 4/1992 | Wald et al | 51/307 |
| 5,131,923 | 7/1992 | Markhoff-Matheny et al. | 51/293 |
| 5,131,925 | 7/1992 | Rostoker et al. | 51/309 |
| 5,131,926 | 7/1992 | Rostoker et al. | 51/309 |

FOREIGN PATENT DOCUMENTS

0293163A2  11/1988  European Pat. Off. .
0394213A1  10/1990  European Pat. Off. .
2-97457    4/1990  Japan .

*Primary Examiner*—Mark L. Bell
*Assistant Examiner*—Willie J. Thompson
*Attorney, Agent, or Firm*—Gary L. Griswold; Walter N. Kirn; Richard Francis

[57] ABSTRACT

An improved abrasive grain comprising the sintered product of a porous non-sintered particle having a coating of inorganic material thereon is provided. A preferred method of making such abrasive grains comprises coating the porous base particles with inorganic particles. The preferred step of coating comprises a step of mixing the base particles with a suspension containing the inorganic particles in a carrier fluid. The porous base particles having the coating of inorganic particles thereon are sintered, to generate the ceramic abrasive grain product. The abrasive grains may be incorporated, to advantage, in a variety of abrasive products including for example bonded abrasives, nonwoven abrasive products and coated abrasive products.

27 Claims, 2 Drawing Sheets

ABRASIVE GRAIN, METHOD OF MAKING SAME AND ABRASIVE PRODUCTS

TECHNICAL FIELD

The present invention relates to improved abrasive grains, in particular, improved alpha-alumina based-ceramic abrasive grains. The invention further concerns methods of preparing improved abrasive grains and abrasive products which contain improved grains.

BACKGROUND OF THE INVENTION

The abrasives industry generally concerns abrasive products comprising a binder and a plurality of abrasive grains. During abrasion, the abrasive grains are brought into contact with a work surface generally at a considerable pressure and with development of a substantial amount of heat. It is important for such operations that the abrasive products appropriately retain the abrasive grains. That is, generally, premature release of the abrasive grains from the abrasive products is to be avoided.

A variety of abrasive products are known, including coated abrasive products, bonded abrasives and nonwoven abrasives. In general, coated abrasive products comprise a substrate or backing having a layer of abrasive grains secured thereto by means of adhesive or binder. A bonded abrasive generally comprises a solid mass formed from abrasive grains and binder, for example a grinding wheel or a cutoff wheel. Nonwoven abrasives generally comprise abrasive grains bound onto and in a nonwoven fibrous substrate by means of binder or adhesive.

Generally, premature release of abrasive grains has been a problem with respect to all of the various types of abrasive products even those from which a controlled rate of release is desired. The problem is particularly significant when the abrasive product is used for high stock removal applications. During such uses, the abrasive product must be able to withstand high pressures and rotative speeds, while still providing a good, sufficient abrasive cut. For example, a coated abrasive disk may traverse 12,000 revolutions per minute (rpm) and be subjected to an interface pressure as high as 15 kg/cm$^2$. Such severe conditions may be preferred for certain applications as they result in increased cut rates. However, they severely tax the integrity of the bond between the abrasive grain and the binder (adhesive) system. If the bond at this interface fails, the abrasive grains are rejected (or shelled) from the abrasive product.

In the coated abrasive industry, the term "shelling" is sometimes utilized to refer to the phenomenon of abrasive grain release from binder, in use. Generally, the term "shelling" is applied whether the product involved is a coated abrasive or some other form of abrasive product, such as a bonded abrasive or nonwoven abrasive. Herein, the term "shelling" is meant to refer in general to premature (i.e. undesired) release of abrasive grains from a binder system (or bond system) without regard to type of construction or substrate involved.

It has been recognized that improvement of the bond between the abrasive grains and the binder system will occur if the surfaces of the abrasive grains are rough rather than smooth. Thus, early efforts to improve the performance of abrasive products with respect to shelling focused on creating a rough surface on the abrasive grains, to facilitate adherence. In more recent years this has evolved into the application of material to the surface of the abrasive grains, which provides a rough surface to facilitate engagement with the adhesive.

In addition, the performance of an abrasive product will in part reflect the characteristics of the abrasive particles. If the abrasive particles are very hard, but not sufficiently tough, they will have a propensity to crack, fracture or crush in use, due to brittleness. The effect of such a failure is analogous to that of premature shelling, i.e. premature loss of an abrasive grain from securement in a useful and operational manner in an abrasive product. A variety of methods have been utilized to improve the performance of abrasive grains with respect to this. These have greatly concerned the chemical and physical nature of the abrasive grains including its composition, density, structure, crystalline nature, etc.

SUMMARY OF THE INVENTION

According to the present invention a method is provided for the preparation of ceramic abrasive grain material. Such material generally comprises abrasive grains utilizable in abrasive products as defined herein. The ceramic abrasive grain is characterized by each abrasive particle thereof being comprised of an alpha-alumina-based core with an exterior surface having a coating of particulate inorganic material autogenously bonded to the exterior surface.

The method generally comprises the steps of (a) providing a mass of porous first particles comprising alpha-alumina precursor material each particle of which is sinterable to an alpha-alumina-based abrasive grain; (b) mixing with said mass, in the presence of a liquid, second particles much finer than said first particles until the second particles are distributed over the exterior surface of each first particle, said second particles being capable of autogenous bonding to the exterior surface of said first particles upon sintering of said first particles; (c) and heating said particles to remove said liquid and then to sinter said first particles and cause autogenous bonding of said second particles to the exterior surface of each of said first particles. Generally, step b is selected from the group consisting of A. (i) adding said second particles to said liquid to provide a dispersion; and (ii) adding said dispersion to said porous first particles; and B. (i) adding said liquid to said porous first particles to provide liquid-impregnated particles; and (ii) mixing said second particles with said liquid impregnated particles.

Generally, second particles are inorganic particles having an average size within the range of about 0.01 micrometer to about 20 micrometers are used for the coating. Preferably the inorganic particles are less than about 1 micrometer in diameter.

Following the step of coating the porous first particles (sometimes referred to as "base particles"), the coated material (i.e., coated base particles) is heated to remove the liquid and then sintered to generate the ceramic abrasive grain material as a sintered product. The step of sintering converts the porous, base particles to a dense hard alpha-alumina-based core, with the inorganic particles forming an autogenously bonded coating thereon. In this context, the term "autogenously bonded" means that the surface coating is bonded to the ceramic particle (core) without any type of external bonding medium such as flux, vitreous bonding material, organic binder, glass or the like. Rather, bonding is the result of binder-free adhesion between the sintered core and the sintered coating.

Typically the ceramic abrasive grains are sintered particles with an average particle size within the range of about 20 to about 4000 micrometers. Preferably, sufficient inorganic particles are added to the porous, base particle to cover at least 70% of the surface, and preferably at least 80%, of the final sintered base particle with coating. Also preferably sufficient material is added to provide an average coating (on the final sintered product) of at least 0.1 micrometer to about 20 micrometers (preferably about 0.5 micrometer to 10 micrometers) thick.

Preferably, the porous, base particles comprise alpha-alumina-precursor particles prepared according to a sol-gel process. Such processes generally concern the formation of a dispersion comprising alpha-alumina oxide monohydrate (boehmite) which is gelled. The gel is dried, crushed and sized for use as the porous, base particles. In some applications the precursor particles are calcined before the second particles are added thereto.

In certain preferred methods according to the present invention the porous, base particles are provided with metal oxide precursor such as a metal salt, sometimes referred to as modifier material, therein prior to the step of sintering. The metal oxide precursor may be introduced into the base particles by impregnation conducted simultaneously with, before, or after coating with the inorganic particles. In general the step of impregnation comprises mixing the porous, base particles with a carrier fluid having the modifier or its precursor (usually as a metal salt) dissolved therein.

Preferred methods according to the present invention comprise utilization of preferred ratios of volume of carrier fluid to weight of base particles during the various mixing steps. In particular, a minimum such ratio is necessary and desirable in order to achieve substantially uniform impregnation and/or coating. When the base particles are formed from the preferred alpha-alumina oxide monohydrate sol-gel process as described, generally at least about 50 milliliters (mL) (preferably 50-60 mL) of carrier fluid is utilized per 100 grams of base particle material, to achieve uniform coating and/or impregnation.

The present invention includes within its scope products made according to the processes defined herein. In addition, it includes within in scope the invention preferred abrasive grain material. Such preferred abrasive grain material generally comprises the sintered product of an abrasive grain precursor which includes a core of the porous base particle having a coating comprising inorganic particulates as described herein. When the abrasive grain precursor (i.e., non-sintered, porous base particle) comprises the product of a sol-gel process made with alpha-alumina oxide monohydrate, the abrasive grains according to the present invention include a core which is alpha-alumina-based. The core may include therein the product resulting from sintering of such a core having present modifier as described herein. The outer surface of the core includes thereon a coating autogenously bonded thereto, the coating comprising the result of sintering an inorganic particulate coating according to the present invention. The coating preferably covers at least 70% of the outer surface of the sintered core, and is preferably at least about 0.1 micrometer thick.

The present invention further includes within its scope abrasive products including therein abrasive grains as defined herein. Such abrasive products are advantageous, for reasons generally discussed in the detailed descriptions below.

The drawings constitute a part of the specification and include exemplary embodiments of abrasive products including particles according the present invention therein. In some instances relative material thicknesses and component sizes may be shown exaggerated, to facilitate understanding.

DETAILED DESCRIPTION OF THE PREFERRED EMBODIMENTS

The present invention pertains to alpha-alumina-based abrasive grains. According to the invention there is provided on the abrasive grain a surface coating of inorganic particles. The inorganic particles are securely bonded to the abrasive grain surface, and provide increased surface area to the particle. This increase in surface area is believed to improve adhesion between the abrasive grain and the binder. In some embodiments, the abrasive grain is further modified by the inclusion therein of metal oxide modifier. Improved characteristics result from the provision of metal oxide within the grain, as described hereinbelow.

Herein the term "abrasive grain" will be used to refer to the granular abrasive material after it has been sintered, i.e., prepared for inclusion in an abrasive product. The term "base particle" will be used to refer to unsintered alpha-alumina-precursor-based ceramic grain precursor which is converted to abrasive grain by sintering.

THE BASE PARTICLE

As indicated previously, the preferred abrasive grains comprise alpha-alumina-based ceramic abrasive grains. The grains are formed from alpha-alumina-precursor-based particles, modified as described herein. In general, the base particles are prepared by drying a dispersion of alumina hydrate material.

Preferred base particles for utilization in particles and processes according to the present invention are unsintered particulate precursor particles which are prepared according to a sol-gel process, for example as disclosed in U.S. Pat. Nos. 5,011,508; 4,881,951; 4,770,671; 4,744,802; 4,623,364; 4,574,003; 4,518,397; and 4,314,827, the disclosures of which are incorporated herein by reference.

To prepare the alpha-alumina-precursor-based particles by a sol-gel process, a dispersion comprising from about 2 to about 60 wt-% alpha-aluminum oxide monohydrate (typically boehmite) is formed, although other hydrates may be used. The weight % is based on a total of hydrate plus liquid carrier, without regard to adjuvants or additives. The boehmite can be prepared from various conventional techniques or it can be acquired commercially. Commercially available boehmite usable in sol-gel processes as described herein includes: Dispersal®, available from Condea Chemie, GMBH, Hamburg, Germany, and Catapal®, available from Vista Chemical Co., Houston Tex. These aluminum oxide monohydrates are in alpha form, are relatively pure (including relatively little, if any, hydrate phases other than monohydrate), and have a high surface area. The typical and preferred liquid carrier is deionized water.

A peptizing agent may be used in the boehmite dispersion, to produce a more stable hydrosol or colloidal dispersion. Monoprotic acids which may be used as the peptizing agent including acetic, hydrochloric, formic, and nitric acids. Nitric acid is the preferred peptizing agent. Multiprotic acids are normally to be avoided since they rapidly gel the dispersion, making it difficult to handle or mix in additional components. Some commercial sources of boehmite contain an acid titer (such as acetic, formic, or nitric acid) to assist in forming a stable dispersion. Such materials may be utilized in processes according to the present invention.

The dispersion may also contain a precursor of a modifier which can be added to enhance some desired property of the finished product or to increase the effectiveness of a subsequent processing step, such as sintering. Such precursors are generally introduced in the form of a salt (typically a metal salt material) soluble in the liquid carrier of the dispersion, and thus typically comprise water soluble salts. Mixtures of modifier precursors may be utilized. Water soluble salts comprising metal salt precursors of the oxides of magnesium, zinc, cobalt, nickel, zirconium, hafnium, iron, manganese, chromium, yttrium, praseodymium, cerium, samarium, ytterbium, neodymium, lanthanum, gadolinium, cerium, dysprosium, erbium, titanium and mixtures of these materials are usable precursors. Exact proportions of these components present in the sol-gel dispersions (for grit formation) are not critical to the principles of the present invention and thus can be varied to convenience.

The dispersion may contain a nucleating agent to enhance the transformation of the alpha-alumina precursor to alpha-alumina and provide a core with a seeded microstructure. Suitable nucleating agents include fine particles of alpha-alumina, alpha-ferric acid, or its precursor, chromia, titanates and any other material which will nucleate the transformation. Nucleating such dispersions is disclosed in U.S. Pat. No. 4,744,802.

The dispersion can be formed by any suitable means. For example, the dispersion can be formed by simply mixing the aluminum oxide monohydrate (and modifier precursor if used) with water containing a peptizing agent; or, by forming an aluminum oxide monohydrate slurry to which the peptizing acid is added. Once the dispersion is formed, it is then gelled and/or dried (i.e., dewatered). The gel can be formed by any conventional technique such as the addition of a dissolved or dispersed metal-containing modifying additive, for example, magnesium nitrate. The pH of the dispersion affects how fast the dispersion will gel. Typically, the pH should be in the range of about 1.5 to 4. In general, the lower the pH, the higher the rate of gelation.

The gel can be shaped or crushed into irregularly shaped particles. Shaping of the gel may be accomplished by conventional means such as pressing, molding, casting, extrusion or cutting, or some combination of those steps, with drying. Shaping may be done in steps, for example, by first forming a plastic mass of the partially dried dispersion through extrusion. The resulting plastic mass is shaped by any convenient method such as pressing molding or extrusion and then dried to produce the desired shape, for example a rod, triangle, pyramid, disk, diamond, cone, or similar shape.

Irregularly shaped abrasive grain products are conveniently formed by depositing the dispersion in any convenient size and shape of drying vessel (for example a pan shaped vessel) and drying, typically at a temperature below the frothing temperature of the dispersion.

Air drying steps may be used to remove free water from either the shaped or unshaped gel. Drying can be accomplished in a forced air oven at a temperature in the range of about 50° C. to about 200° C., preferably between about 100° C. and 150° C. Generally, the drying is conducted until the product contains 1 to 40%, preferably, 5 to 20%, by weight-free water. To inhibit frothing, drying is typically conducted with a slow increase in temperature up to the ranges stated.

After the gel has dried or dewatered, if particle size reduction is needed, the dried gel can be converted into base particles by crushing, for example with a hammer mill, ball mill or roll crusher. Any method of comminuting the solid can be used and the term "crushing" is meant to refer to any such method. In general, a wide variety of particle sizes, i.e., about 0.1 micrometer to about 4 millimeters, may be used as base particles. Generally, a selected size range is isolated for any given use. Classification steps such as screening may be used to obtain selected particle sizes or size fractions. It is noted that subsequent sintering generally leads to particle shrinkage, on the order of 33% of linear dimension. This should be taken into consideration during fraction selection.

The dried gel may in some instances comprise the base particles. In other instances, the dried base particle material will comprise a "particle precursor", the base particle being formed by calcining the dried particle material. In typical applications, it will be preferred to calcine the base particles to remove water or any other volatiles.

During calcining, the base particles are generally heated to a temperature between about 400° C. and about 1000° C., preferably 400° to 800° C. The base particles are held within this temperature range until the free water and preferably over 90 wt-% of any bound volatiles are removed. If the particle precursor contains a modifier precursor, preferably the base particles are calcined for a period of time sufficient to achieve essentially complete conversion of the modifier precursor to metal oxide.

CONVERSION OF BASE PARTICLES TO IMPROVED ABRASIVE GRAINS

According to the present invention, base particles are converted into improved abrasive grains through application of one or more treatments. In order to improve the surface of the base particles with respect to adhesion to a binder, the base particles are coated with inorganic particles. In order to improve the physical properties of the base particles, for example to increase density and/or toughness, the base particles may be impregnated with various materials. Further, a nucleating agent can be provided to the base particles after their formation.

The base particles may in some instances be improved by more than one of the above described treatments. In addition, in some preferred processes according to the present invention, more than one of the treatments (improvements) can be accomplished simultaneously.

A. Optional Impregnation of the Base Particles with Modifier Precursor

General methods of impregnating particles from dried alumina hydrate dispersions are described in U.S. patent application Ser. No. 07/799,867 filed Nov. 27, 1991 incorporated herein by reference. Such methods may be applied to base particles according to the present invention, prior to coating of the base particles with inorganic particles as described herein.

In general, impregnation of pores in the porous base particles with appropriate modifier precursor provides for increases in density and improved toughness of the sintered grain. The modifier or component for impregnation (i.e. the impregnate) will generally be a precursor of a metal oxide provided in the form of one or more salts of a metal, for example a nitrate or acetate salt. The metal salt material is dissolved in a liquid medium, and a mixture with the porous base particles is formed. Impregnation of the pores of the base particles is thought to occur through capillary action. If the impregnating solution has a high viscosity, impregnation will be improved by subjecting the porous base grits to vacuum treatment before the mixing step.

While any of a Variety of liquid media may be utilized, typically an aqueous media (deionized) in which the salt is soluble will be used. The concentration of the salt in the liquid medium should typically be within a range of about 5% to 40% dissolved solids, on an oxide basis. Usable modifier precursors include those identified above as usable in the sol gel process.

Generally impregnation will be sufficient to improve the porous base particles, provided that the resulting base particle, after impregnation and later sintering, includes at least 0.1% by weight, and preferably about 1% to 30% by weight of the oxide product of the impregnate (the weight percentage being calculated on the basis of the total weight of the final fired abrasive grain and on a theoretical elemental oxide basis).

In some instances more than one impregnation step may be utilized. Indeed, the same impregnation mixture (or impregnate) may be applied in repeated treatments. Subsequent impregnation solutions may contain different concentrations of the same salts and/or involve different salts or different combinations of salts. For example, the first mixture may contain a first metal salt and a second impregnation mixture concern a second metal salt. Herein the term "impregnate" is meant to refer to the material which is impregnated into the porous base particles, i.e. which, through capillary action, is introduced into its pores.

In order to achieve good uniform distribution of the impregnate throughout the base particles, it is desirable to provide a minimum ratio of volume of impregnate carrying liquid (solution) to weight of base particles being impregnated. In general, when the base particles are prepared according to the process described above, there should be at least 50 ml of solution added to achieve impregnation of 100 grams of porous base particle material. Preferably at least about 60 ml of solution to 100 grams of base particle are utilized, to ensure that any solvent loss during the mixing process does not pose a problem with respect to uniform and complete impregnation. The minimum ratio stated is generally a reflection of volume and surface area represented by 100 grams of base particles, and the amount of carrier fluid needed in order to ensure wetness (saturation) of all surface area and internal pore area of such a weight or volume of base particles.

In general, the impregnated base particles will be coated with inorganic particles as described hereinbelow, before they are sintered. In typical processes according to the present invention, it is not necessary to dry the impregnated base particles prior to the step of coating. In some instances coating and impregnation may be conducted simultaneously.

Upon sintering of the impregnated base particle to form the sintered, ceramic, product, the impregnate (or modifier) may react with the alumina to form a reaction product. For example, the oxides of cobalt, nickel, zinc and magnesium will typically form a spinel structure with the aluminum. Yttria will typically react to the alumina to form $3Y_2O_3 \cdot 5Al_2O_3$ a garnet crystal phase. Praseodymium, samarium, ytterbium, neodymium, lanthanum, gadolinium, cerium, dysprosium, erbium, and mixtures of two or more of these rare earth metals will typically react with the alumina to form a garnet, beta alumina, or perovskite. Certain rare earth oxides and divalent metal oxides will react to the alumina to form a hexagonal rare earth aluminate structure $LmMAl_{11}O_{19}$. Where Lm is a trivalent metal ion such as La, Nd, Ce, Pr, Sm, Gd or Eu and M is a divalent metal cation such as Mg, Mn, Ni, Zn, Fe or Co. Hexagonal rare earth aluminates have exceptional properties in an abrasive grain. In particular they are observed to exist as a whisker or platelet, rather than particulate. Such whiskers typically have a length of about 0.5 micrometer to about 1.0 micrometer, and a thickness of about 0.5 micrometer or less. It is believed that such whiskers may inhibit crack propagation. The whiskers are more likely to occur in the absence of nucleating agent.

B. Coating of the Base Grits

A substantial improvement in abrasive grains is provided according to the present invention by providing a coating of inorganic particles onto alpha-alumina base particles. Improvement will result from application of such a coating to the base particles regardless of whether the base particles are also provided with modifier precursor. The degree to which both modifications (modifier precursor, coating) are desired and applied will be determined by the ultimate use to which the base particles are to be put.

A purpose of providing a coating of inorganic particles on the base particle is to provide an abrasive grain having an increased surface area or surface area ratio for contact with binding agent or adhesive, when the abrasive grains are incorporated into an abrasive product. Abrasive grains prepared according to the present invention can be provided with a surface area ratio of at least 2:1, and more preferably at least 4:1. In fact, a 10:1 ratio can be achieved, for example with a 3% coating (by weight in the final sintered product). The surface area ratio, a measure of the increase of the surface area of the abrasive grain, is determined by dividing the surface area of the abrasive grain after application of the coating of inorganic particulate material by the surface area of the untreated abrasive grain, for a given grade. The grading standard for abrasive grains is found in American National Standard Institute (ANSI) Standard No. B74.18, 1984. Measurements of surface area ratios are described in U.S. Pat. No. 5,011,508.

For preferred applications of the invention, there is preferably at least 70% and more preferably at least 80% coverage of the surface area of the base particle, after sintering, with the inorganic coating. It is an advantage of certain of the techniques presented herein that in some instances greater than 90% coverage can be readily obtained. With respect to the amount of coverage, the intent is to make reference to the amount of exposed sintered particle (core) surface in the resulting coated grain. Thus, coverage of at least 70% means that no more than about 30% of the total area of the underlying sintered base particle is exposed, i.e., not covered with particulates. The amount of coverage in this context is not meant to refer to the nature (e.g., porosity) of the particulate coating. The coating can be continuous or discontinuous.

Preferably the coating should be applied such that after sintering the resulting coated abrasive grain has a coating thereon which is relatively porous. The result of being porous is that the surface area of the abrasive grain is high and the adhesion to the binder is improved. In this context, the term "porous" is meant to indicate that the coating has a density of less than 90%, preferably less than 80%, of theoretical. Most preferably, it has a density of at least 40%, but less than 70% of theoretical. This does not mean that the coating is discontinuous, but rather that it comprises a layer with pores extending therethrough. The density figure given is meant to refer to the average density of the coating, and not the density of the fused particles (individually), that make up the coating. That is, the coating comprises dense particles which are packed together and fused, with some open space therein.

In contrast to the coating, the sintered base particle will generally have a relatively high density, typically at least greater than 90% and preferably greater than 95% of theoretical. Most preferably, the base particles after sintering will have a density of at least 97% of theoretical. The density of abrasive grains can be readily measured with a helium gas pycnometer, such as one available under the trade designation MICROMETERITICS ACCUPYC 1330.

After the sintering step, the coating may contain more than one layer of inorganic particles. In typical instances there will be between 2 and 30, and generally 3 to 20 layers. Preferably, at least 5 to 15 layers in inorganic particles are provided, stacked on one another. The stacking leads to the preferred porosity of the coating and also the continuous nature of coating. Multiple layered coatings are readily obtained by providing a sufficient number of inorganic particles in the suspension.

During the sintering step, the inorganic particles in the coating will typically sinter to one another. The result of this is that the coating will have good structural integrity.

A variety of inorganic particles may be applied as the coating of inorganics. Preferably, the particles comprise metal oxides, metal nitrides, metal carbides, metal oxynitrides, metal oxycarbides or combinations thereof. Examples of such inorganic particles include: transitional alumina, alpha-alumina, hydrated aluminas, yttria, magnesia, rare earth metal oxides, zinc oxide, iron oxide, silica, silicates, chromuim oxide, titanium oxide, nickel oxide, yttrium alumina garnet, hexagonal rare earth aluminate, alumina zirconia, zirconia oxide, silicon nitride, alumina oxynitride, titanium carbide, titanium nitride, silicon alumina oxynitride, silicon aluminum oxycarbide, and combinations thereof. At present, it is believed that zirconia and alumina coatings will be preferred, for many applications.

If the coating of the sintered alpha-alumina-based core contains a silicon containing compound, it is preferred that such compound be crystalline. If it is not, it is preferable that the surface coating contain (after sintering) less than about 5% by weight, and preferably less than 1% by weight, silica (most preferably less than about 0.5% by weight).

It is foreseen that in typical situations, the average particle size of the base particle will be between about 20 micrometers and about 4000 micrometers, most typically with at least 90% by weight within the range of about 50 to 2000 micrometers. Base particle of appropriate size can be readily achieved through conventional processes including various cutting, casting, crushing or classification processes such as screening.

The inorganic particles should be of appropriate size to provide for coating with minimal spacing between the inorganic particles, and preferably substantially continuous coverage of the surface of the base particles. The average particle size of the inorganic particles will generally be between about 0.01 micrometer and about 20 micrometers, preferably less than 10 micrometers, and most preferably about 0.01 micrometer to about 1 micrometer. Inorganic particles within the preferred size range can be obtained from various commercial suppliers or by wet ball milling.

In one preferred process, the coating of inorganic particles is applied to the base particles (or base particle precursor) by deposition from a liquid medium. The liquid medium can be water (preferably deionized) or an organic solvent. Generally, if the liquid medium is water or a polar organic solvent, then before deposition of the coating, the base particle should be calcined. However, if the liquid medium is a non-polar organic solvent then it will not be necessary to calcine the base particle prior to coating.

Suitable non-polar organic solvents include cyclohexane, hexane, and toluene. Suitable polar solvents include acetane, methanol, ethanol, and methyl ethyl ketone. The preferred liquid medium is water, more preferably, deionized water.

Generally the coating mixture should comprise between about 0.01% and about 20%, preferably about 0.1% to about 5%, by weight, of inorganic particulates, the weight percentage being based upon weight of particulates plus carrier liquid (water, acetone, etc.) without regard to other additives or adjuvants. The mixture may include adjuvants such as wetting agents or dispersing agents, typically in amounts effective to provide the properties desired to the mixture or dispersion. The suspension (mixture) may be formed by any conventional means such as mixing with a continuous mixer, batch mixer, ball milling device, cement mixer, a vibrator or a tumbler.

Coating can be accomplished by simply mixing the base particles with the coating mixture. The combination generally comprises mixing by any of a variety of techniques including, for example, screw auger, batch mixer, continuous mixer or the like. One preferred technique is to feed the coating mixture and base particles into a continuous mixer from individual feed streams.

In order to obtain a substantially uniform coating of inorganic particulates on the base particles, a minimum ratio of volume of carrier liquid to weight of grits to be coated, is preferred. Generally, at least 50 mL of liquid volume is the minimum preferred to ensure good inorganic particulate coating of 100 grams of base particle material if the base particles are prepared as described above. Preferably about a 20% excess of liquid volume over this amount, i.e., 60 mL liquid per 100 grams of base particle, is desirable to ensure good coating and processing. It is noted that this ratio is the same ratio presented hereinabove for preferred impregnation of the base particle.

The base particles are porous; i.e. they have relatively small pores therein, between about 5 and 50 Angstroms. Such pores are too small for penetration of the majority of the inorganic particles. However, through capillary attraction, the liquid will be pulled to those pores bringing the inorganic particles to the surface of the base particles. This facilitates provision of a good even coat, provided sufficient coating mixture is used, with substantially complete coverage of the outer surfaces of the base particles. Generally, enough fluid to saturate (or at least 70% saturate) the base particles is preferred.

Following immersion or coating, the coated base particles are dried sufficiently so that the base particles do not stick together. This may include a step of simply separating from the liquid medium (if excess liquid medium was used), followed by any of a variety of drying steps including air drying or drying in a forced air oven in a temperature in the range of about 50° C. to 200° C. It is foreseen that in typical applications, forced air drying at temperatures of about 100° C. to 150° C. will be preferred, especially when the liquid medium is water.

The thickness of the coating may be varied depending upon the amount of treatments conducted with the coating solution. In general, sufficient amount of coating solution treatment should be conducted to achieve a coating thickness within the range of about 0.1 to about 20, and preferably about 0.5 to 10, micrometers. It is foreseen that for typical preferred applications, coating thicknesses on the order of about 0.5 to 2 micrometers will be preferred. Coating thickness is generally controlled by controlling weight of inorganic particles to weight of base particles, as well as by the relative size and number of the particles.

The amount of coating may also be measured and calculated on the basis of weight % of the coating relative to the base particle. For typical preferred processes according to the present invention, preferably sufficient coating is applied to the base particle to provide such a weight % (% of coating to alumina-based core in sintered product, calculated on theoretical basis determined by starting products), within the range above 0.01 to 10%, and preferably 0.1 to 5%. Preferred abrasive grains according to the present invention will be prepared from base particles wherein the coating weight % is about 0.1 to 2%.

In general, achievement of the stated amount and nature of coating is readily accomplished through practice of the method as outlined herein, especially if the preferred ratio of liquid volume to weight of base particles, is practiced. When a ratio of about 50 mL liquid volume to 100 grams base particles is used, there is 100% or near 100% of incorporation of the inorganic particulates onto the base particles, in a coating form (similarly if impregnate is utilized there is nearly 100% incorporation of impregnate within the liquid into the grits). Thus a step of removing excess solution and/or particulates is avoided, when this ratio is obtained. In addition uniform and substantially continuous coverage is obtained. Multiple coating steps may be practiced, to build up the coating.

Alternate methods of providing the particulate coating on the base particles are possible. For example, if the base particles are wet (substantially saturated, i.e. at least 70% and preferably all pore volume is filled with liquid and a liquid film is present on the surface of the base particles), for example with water, a coating can be provided by adding (such as by sprinkling) inorganic particulate to the wet base particles or other mixing. This method may be utilized, for example, following a step of impregnation of the base particles without drying. In general, the liquid (typically deionized water) on the base particles will act as a binder to attract and retain the inorganic particulates in position as coating. Further, it is foreseen that the base particles and inorganic particulates can be mixed together dry, with follow-up liquid (typically deionized water) addition and mixing to achieve a coating. In general, what is required is the provision of an appropriate amount of the three components: liquid carrier, inorganic particulate, and base particles, to achieve the desired coating. Generally, enough liquid should be used to achieve saturation as above defined, since the liquid serves as a temporary binder for the coating.

C. Sintering of the Abrasive Grain Precursor

The base particles, once coated with the inorganic particulates, comprise a precursor to an alpha-alumina-based ceramic abrasive grain. Upon sintering, the resultant coated abrasive grits form a unique and improved abrasive grain for use in abrasive products. The sintering, inter alia, generates autogenous bonding between the inorganic particulates and the sintered base particle. This results in an abrasive grain which is both very hard and appropriately tough, while at the same time has a unique rough outer surface available for excellent adhesion.

The sintering of the grains may be accomplished through a variety of conventional processes. Typically, the sintering will be conducted at a temperature between about 1200° C. and 1650° C., for a sufficient period of time to complete the conversion of the precursor. Generally sintering can be accomplished within a time period of a few seconds to about 120 minutes. Sintering of various types of base grits is described in general in U.S. Pat. No. 4,314,827, incorporated herein by reference. The techniques of sintering applied therein may be applied to treated base particles as described herein. It is also within the scope of this invention to sinter in a reducing atomosphere.

D. Simultaneous Impregnation and Coating

As indicated above, it is possible to first impregnate the porous base particles with an impregnating solution and then conduct a follow-up step of coating the base particles with the inorganic particles. Such a process may be achieved, for example, by merely conducting the two processes described hereinabove in series, typically with impregnation conducted first. In some instances impregnation may be conducted second, i.e., after coating. This is possible because the coating is relatively porous.

It has been determined that impregnation and surface coating may be conducted simultaneously, to advantage. If the base particles are mixed with a liquid medium having modifier precursor as described above therein while at the same time having inorganic particulates as described above suspended therein, both impregnation and inorganic particulate coating will result, to advantage. It has been found that the inorganic coating will not occur in such a manner that impregnation is inhibited. Further, impregnation conducted at the same time as the coating does not interfere with the capillary attraction which facilitates the coating process. Thus, through this processing an improved advantageous abrasive grain may be obtained.

The inorganic particles added to the base particles may include nucleating agent or nucleating agent precursor. In general, the nucleating agent can be readily applied by treating the base particles with a liquid medium having the nucleating agent (or a precursor to it) carried therein. The preferred liquid medium is deionized water. The coating mixture should generally contain between about 0.01% and 10% (and preferably 0.1% to 5%) nucleating agent by weight (the weight percentage being based solely on consideration of the liquid medium and nucleating agent without regard to any other materials that might be contained within the mixture or suspension). The nucleating agent may be applied to the base particles prior to impregnation, simultaneously with impregnation, prior to inorganic particulate coating, simultaneously with inorganic particulate coating or simultaneously with both impregnation and inorganic particulate coating.

As indicated herein, the nucleating agent may be added either during base particle formation (i.e. in the sol-gel process) or after base particle formation, as described in this section. Depending upon when the nucleating agent is added, products of different character may result. If the nucleating agent is added during the sol-gel process, it will generally be dispersed throughout at least some of the grits. On the other hand, if added as described in this section, after grit formation, the nucleating agent will generally only occupy outer most portions of the base particle and portions of the coating.

If the nucleating agent is added during the sol-gel process, those abrasive grits with nucleating agent dispersed throughout will have uniform hardness and toughness throughout the grain, upon sintering. On the other hand if the nucleating agent is added after base particle formation, central portions of the resulting abrasive grit after firing will have a different hardness and toughness from its outer portions from that of its inner portion.

ABRASIVE GRAINS

The present invention includes within its scope the provision of improved abrasive grains. Preferably, the abrasive grain comprises a fired base grit comprising at least 55% by weight aluminum oxide, with a surface coating thereon comprising a substantially continuous coating of inorganic particles.

Up to 100% by weight of the underlying (sintered) grit may comprise alpha-alumina. However, up to 45% by weight of the underlying (sintered) grit may comprise a metal oxide (or product of sintering metal oxide) on an oxide basis.

An alternate manner of characterizing certain abrasive grains prepared according to the present invention is by characterizing layers or regions within the grains. In particular, certain abrasive grains will have distinct regions of microstructure. A first region is the outer-most surface coating, generally comprising a coating of inorganic particles as previously described.

A second region extends about 1 micrometer to about 5 micrometers into the underlying (fired) base particle, from the outer surface thereof or from the very bottom area of the coating. This region comprises, at least in part, reaction product of alumina and the inorganic particles of the coating. It may also be a hard, seeded microstructure, if nucleating agent was provided on or near the surface of the base particle. It will also include reaction product of alumina with modifier, if modifier precursor was used. For example, alumina and magnesium oxide typically form spinel.

A third region is the center portion of the underlying (sintered) base particle and comprises alpha-alumina. It may include the reaction product of alumina with metal oxide (if present). If a divalent metal oxide and a rare metal earth oxide are provided in this region, without seeding, the region may also contain whiskers or platelets.

Figure 4:
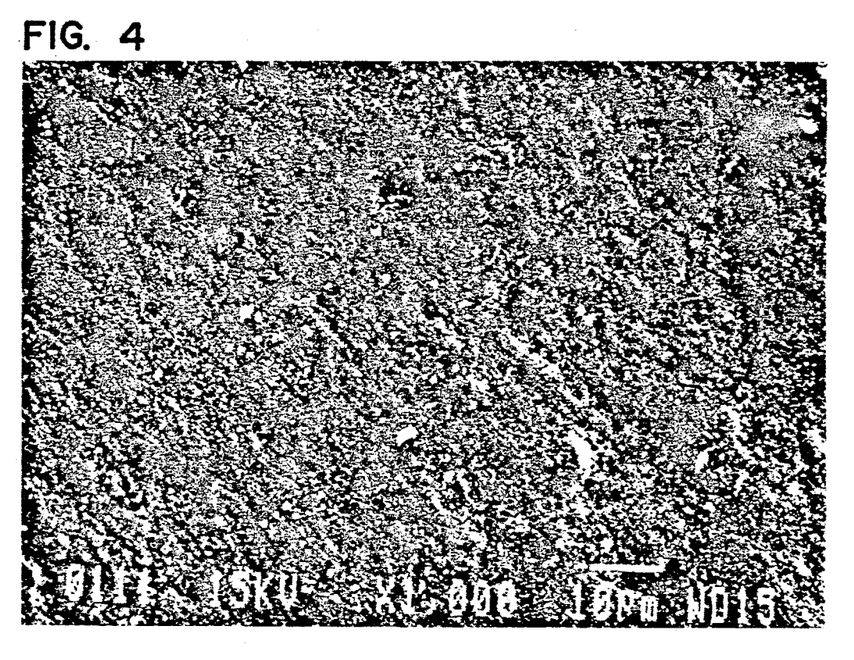
FIG. 4 is an electron photomicrograph of a ceramic abrasive grain prepared according to the principles of the present invention.
Figure 5:
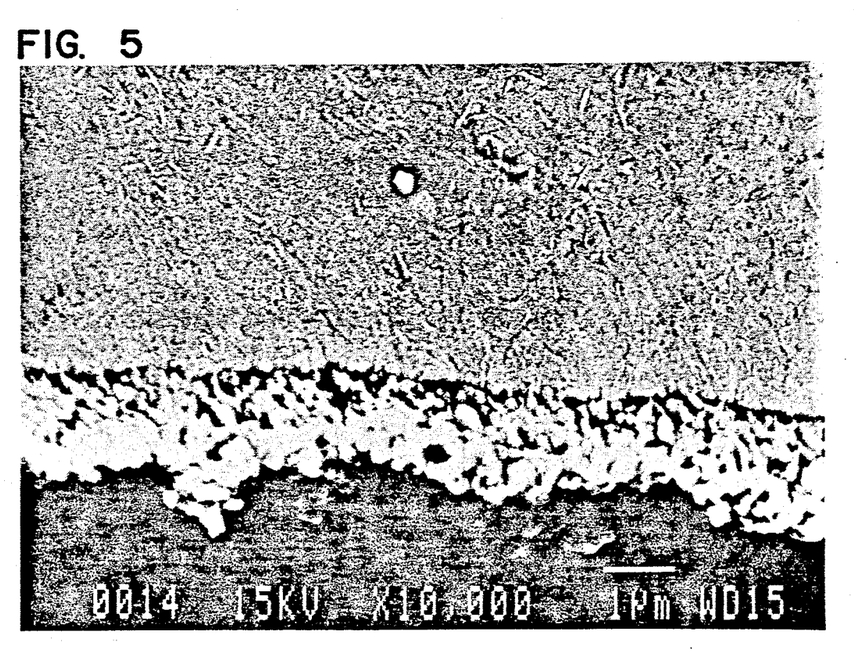
FIG. 5 is an electron photomicrograph of a cross-sectional surface of an abrasive grain prepared according to the principles of the present invention.

Attention is now directed to FIGS. 4 and 5. FIG. 4 is a scanning electron photomicrograph of a sintered, coated, particle made according to example 10. The scale of the micrograph is 1000×. Examination of the photomicrograph reveals that the underlying ceramic or base grit core is covered by a substantially continuous coating of inorganic particulates.

FIG. 5 is a scanning electron photomicrograph of the particle from the processing batch utilized to prepare the particle depicted in FIG. 4; the photo micrograph of FIG. 5 being of the particle in cross section. The porous particulate coating is readily viewable residing on an outer (bottom) surface of the grain and comprises small, light colored, spheres. The coating is about 1 micrometer thick. Immediately underneath the coating is a region about 5 micrometers thick which is a dense, seeded region which contains substantially no whiskers or platelets therein. The central portion of the dense core, about 6 micrometers in from the outer surface of the coating, contains a substantial amount of whiskers or platelets as described herein.

In characterizing the abrasive grains in the previous paragraphs, reference has been made to the underlying sintered base particle (or alpha-alumina-based core). By this term, reference is meant to the portion of the abrasive grain which resulted from sintering of the base particle (not coating) after treatment.

ABRASIVE PRODUCTS

The present invention includes within its scope the provision of abrasive products including abrasive grains as described herein. Preferably, the abrasive grains will have been prepared according to the processes described herein and comprise the sintered product of a porous base particle having an inorganic particulate coating thereon.

One type of abrasive product according to the present invention comprises a backing (substrate) with abrasive grains as described herein adhered thereto by a binder. The backing may be cloth, polymeric film, fiber, nonwoven web, paper, or combinations thereof or treated versions thereof. A variety of inorganic or organic binders could be utilized. The abrasive grains may be applied in one layer or in a plurality of layers. A preferred method of making coated abrasives is described in U.S. Pat. Nos. 4,734,104 and 4,737,163, incorporated herein by reference. In general, coated abrasive products including abrasive grains according to the present invention therein are improved with respect to potential for shelling and longevity.

Figure 1:
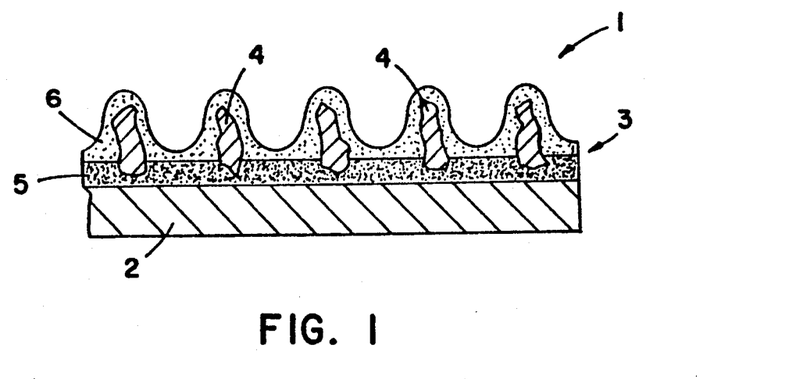
FIG. 1 is a fragmentary cross-sectional schematic view of a coated abrasive product including abrasive grains thereon, according to the present invention.

An example of a coated abrasive product is depicted in FIG. 1 at reference numeral 1. Referring thereto, backing (substrate) 2 has a coating 3 comprising abrasive grains 4 secured to the backing 2 by binder. In the example shown, the binder comprises make coat 5 and size coat 6.

Figure 2:
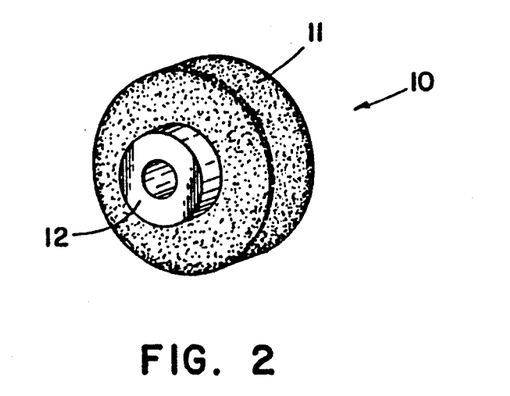
FIG. 2 is a perspective view of a bonded abrasive product including abrasive grains therein according to the present invention.

Bonded abrasive products according to the present invention generally comprise shaped masses of abrasive grain as described herein, held together by organic, metallic, or vitrified binder. A particularly common shaped mass for abrasive products is a grinding wheel. In FIG. 2, wheel 10 is depicted, comprising grains 11 molded in a wheel and mounted on hub 12.

Figure 3:
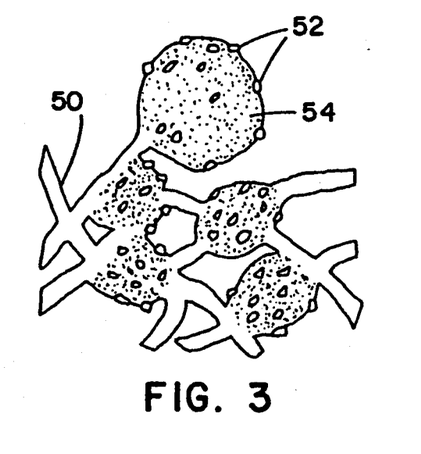
FIG. 3 is an enlarged schematic view of a nonwoven abrasive product incorporating abrasive grains according to the present invention.

Nonwoven abrasive products incorporating abrasive grains according to the present invention, typically comprise an open porous lofty polymer filament structure (substrate) having the abrasive grains of the invention distributed throughout the fiber structure and bonded therein by an organic binder. Typical fibrous filament structures usable with such constructions comprise polyamides, polyesters, or polypropylene. In FIG. 3, a schematic depiction, enlarged about 100×, of a typical nonwoven abrasive article is provided. The article comprises a fibrous mat 50 as a substrate, onto which abrasive grains 52 are adhered by binder 54. For further details regarding nonwoven abrasive products see U.S. Pat. No. 2,958,593 (Hoover et al.), the disclosure of which is incorporated herein by reference.

A wide variety of binders may be used in abrasive products according to the present invention, including conventional ones. Useful binders include phenolic, urea-formaldehyde, melamine-formaldehyde, polyester resins, glue, aminoplast resins, epoxy resins, acrylate resins, urethane resins and combinations thereof. The binder may also include additives such as grinding aids, fillers, coupling agents, dyes, pigments, wetting agents, and dispersion aids. Examples of such grinding aids include iron sulfides, cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grains which have been improved according to the descriptions herein. In addition, or alternatively, the abrasive articles may contain a blend of abrasive grains according to the present invention with conventional abrasive grains or diluent grains. Conventional abrasive grains usable in this fashion include, for example, fused aluminum oxide, silicon carbide, garnet, fused alumina zirconia, diamond, cubic boron nitride and other sol gel abrasive grains. Diluent grains include marble, gypsum, and glass. Generally, at least about 10% by weight, preferably about 50% to about 100% by weight of the grains of an abrasive product according to the present invention are of improved abrasive grains as described herein.

Abrasive grains according to the present invention may be combined with abrasive agglomerates. Examples of abrasive agglomerates are provided in U.S. Pat. Nos. 4,652,275 and 5,078,753, the disclosures of which is incorporated herein by reference.

EXAMPLES

The following examples are illustrative of certain specific embodiments of this invention. The abrasive grains were made according to one of procedures outlined below and then the abrasive grains were incorporated into a coated abrasive fiber disc or an endless belt as described below. The coated abrasives were tested according to one of the Test Procedures described below. In some instances, the test results are given as a percent of the comparative example. The comparative example was normalized to 100% and then the example was measured against this 100%. All abrasive grain and binder formulations are based upon weight. Deionized water was used in all examples.

GENERAL PROCEDURE I FOR MAKING THE ABRASIVE GRAINS

The following were dispersed together using a high shear mixer: 69.8 parts of approximately 60° C. deionized water; 2.3 parts of technical grade nitric acid which was 70% concentrated; and, 28.5 parts alpha aluminum oxide monohydrate powder sold under the trade designation Disperal ®. The resulting sol was dried over a 24 hour period starting at about 100° C. and increasing the temperature to about 180° C. After drying, the sol was a friable solid that was then crushed and screened. The screened particles passed through a screen containing 1 mm openings but were retained on a screen containing 0.125 mm openings. The screened particles were then fed into the end of a rotary kiln (i.e. calciner) to substantially remove the bound volatiles. The rotary kiln had a hot zone feed end temperature of 350° C. and exit end temperature of 650° C. These particles are hereinafter designated calcined particles.

In this procedure, the impregnating mixture and coating mixture were combined into one. Into a 19 liter container were added the calcined particles along with an impregnating/coating mixture. To prepare the impregnating/coating mixture 190 grams lanthanum nitrate and 230 grams magnesium nitrate were first mixed together. The concentration of the lanthanum nitrate was 23% based on an oxide basis. The concentration of the magnesium nitrate was 11% based on an oxide basis. Then enough water was added to make 0.95 liters of impregnating/coating mixture. The container was rotated to cause the metal salt and water from the impregnating/coating mixture to be impregnated into the calcined particles by capillary action. Additionally, if the impregnating/coating mixture contained inorganic particles, the inorganic particles substantially remained on the surface and did not impregnate into the calcined particles. After this impregnation step, the resulting particles were then fed into a rotary calciner as described previously. The resulting grains exited from the calciner and were fed into a 1400° C. rotary kiln which was a 8.9 cm diameter, 1.32 meter long, silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

GENERAL PROCEDURE II FOR MAKING THE ABRASIVE GRAINS

The abrasive grains made according to General Procedure II were made in the same manner as General Procedure I, except for the following changes. The impregnating mixture consisted of: 887 parts of deionized water, 4063 parts magnesium nitrate, 5540 parts of an equal weight percent mixture of lanthanum nitrate, neodymium nitrate and yttrium nitrate, 77 parts of cobalt solution. The concentration of the magnesium nitrate was 11% based on an oxide basis. The concentration of the lanthanum nitrate, neodymium nitrate and yttrium nitrate were 23% based on an oxide basis. The cobalt solution consisted of cobalt nitrate flakes and was 24% concentrated based on an oxide basis. To this impregnating mixture was mixed in additional deionized water in a ratio of 100 parts impregnating mixture from above to 108 parts additional deionized water.

The impregnating mixture was mixed with the calcined particles such that the impregnating mixture penetrated into the pores of the calcined particles. After this step and before drying, the calcined impregnated particles were mixed with a plurality of inorganic particles. The inorganic particles did not substantially penetrate into the pores of the calcined impregnated particles; the inorganic particles remained on the surface of the particles. The remaining steps to calcine and sinter the particles to form abrasive grains were the same as described above in General Procedure I.

GENERAL PROCEDURE FOR MAKING THE COATED ABRASIVE FIBER DISC

The abrasive grains were utilized in coated abrasive products which were tested for abrasiveness. The coated abrasive products were made according to conventional coated abrasive making procedures. The abrasive grains were screened such that 50% by weight passed through a 30 mesh U.S. standard screen, but were retained on a 35 mesh U.S. standard screen and 50% by weight passed through a 35 mesh U.S. standard screen, but were retained on a 40 mesh U.S. standard screen. The abrasive grains were bonded to vulcanized fiber backings that were 17.8 cm in diameter and contained a 2.2 cm center hole. The make resin was a conventional calcium carbonate filled phenolic and the size resin was a conventional cryolite filled phenolic. The make resin was precured for 90 minutes at 88° C. and the size resin was precured for 90 minutes at 88° C. followed by a final cure of 10 hours at 100° C. After curing, the fiber discs were flexed. The abrasive grains were electrostatically coated.

GENERAL PROCEDURE FOR MAKING THE ENDLESS COATED ABRASIVE BELT

The coated abrasive backing for the endless belt was a Y weight woven polyester/nylon cloth with a four over one weave. The backing was saturated with a conventional phenolic/latex resin and then placed in an oven to partially cure the resin. Then a conventional phenolic/latex resin and calcium carbonate solution was applied to the back side of the backing and heated to partially cure the resin. Finally, a conventional phenolic/latex resin was applied to the front side of the cloth and heated to partially cure the resin. The backing was completely treated and was ready to receive the make coat.

After the backing was treated, a make coat binder was prepared that consisted of 48% resole phenolic resin and 52% calcium carbonate filler. The make coat was diluted with a 90/10 water/glycol ether solvent to 84% solids. The make coat was roll coated onto the backing with a dry weight of 230 g/m². Immediately afterwards, the abrasive grains were electrostatically coated into the make coat with a weight of 620 g/m². The resulting construction was precured for 90 minutes at 88° C. to partially cure the phenolic resin. Next, a size coat was roll coated over the abrasive grains with a dry weight of 400 g/m². The size coat consisted of 48% resole phenolic resin, 2% iron oxide and 50% calcium carbonate. The size coat was diluted with a 90/10 water/glycol ether solvent to 76% solids. The resulting construction was heated for 35 minutes at 66° C. and then for 75 minutes at 88° C. The coated abrasive product was finally cured for 10 hours at 100° C. Next over the size coat at a dry weight of 150 g/m² and then cured for 30 minutes at 100° C. The supersize consisted of 14.3 parts bisphenol epoxy resin (commercially available from the Shell Chemical Company, Houston, Tex., under the trade designation "Epon 828"), 9.4 parts polyamide curing agent (commercially available from the Henkel Corporation, Gulph Mills, Pa., under the trade designation "Versamid 125"), 71.25 parts KBF₄, 1.9 parts thickening agent commercially available from the Cabot Corp., Kokomo, Ind., under the trade designation "Cab-o-Sil", 3.06 parts iron oxide filler and 100 parts organic solvent (commercially available from the Worum Co., St. Paul, Minn., under the trade designation "Aromatic 100"). The coated abrasive was flexed prior to testing.

TEST PROCEDURE I

The coated abrasive disc was mounted on a beveled aluminum back-up pad, and used to grind the face of a 1.25 cm by 18 cm 1018 mild steel workpiece. The disc was driven at 5500 rpm while the portion of the disc overlaying the beveled edge of the back-up pad contacted the workpiece at about a 6 kg load. Each disc was used to grind a separate workpiece for a one minute interval for a total time of 12 minutes. The initial cut was the amount of metal removed in the first minute of grinding. Likewise the final cut was the amount of metal removed in the last minute of grinding and the total cut was the summation of the amount removed throughout the test.

TEST PROCEDURE II

Test Procedure II was the same as Test Procedure I, except that the test endpoint was when the amount of metal removed in a 60 second interval was less than 25 grams.

TEST PROCEDURE III

Test Procedure III was designed to measure the time it took for the abrasive grain to shell from a coated abrasive disc. The test equipment included a 17.8 cm diameter test coated abrasive disc with a 2.2 cm mounting hole attached to a 16.5 cm diameter 1.57 mm thick hard phenolic backup pad which was in turn mounted on a 15.2 cm diameter steel flange. The test disc so supported was rotated counter-clockwise at 3550 rpm. The 1.8 mm peripheral edge of a 25 cm diameter 1018 carbon steel disc shaped workpiece deployed 18.5° from a position normal to the abrasive disc and rotated counter-clockwise at 2 rpm, was placed into contact with the abrasive face of the abrasive disc under a load of 2.9 kg. At the start of the test and at 120 second intervals, the workpiece was weighed to determine the amount of steel removed or abraded. The test endpoint was 20 minutes or when the disc began to shell, i.e., a substantial portion of its abrasive grain flew off of the discs, whichever occurred first. The total cut was the amount of steel abraded during the entire test.

TEST PROCEDURE IV

Test Procedure IV was the same as Test Procedure III except for the following changes. The angle was 7.5°, not 18.5° and the load was 2.9 kg at the abrading interface. The test endpoint was when the amount of metal removed in a 120 second interval was one third the value of the amount of metal removed in the first 120 second interval of grinding of the comparative example.

TEST PROCEDURE V

The coated abrasive was converted into 7.6 cm by 335 cm endless belt and tested on a constant load surface grinder. A pre-weighed, 1018 mild steel workpiece approximately 2.5 cm by 5 cm by 18 cm was mounted in a holder. The workpiece was positioned vertically, with the 2.5 cm by 18 cm face facing an approximately 36 cm diameter 85 Shore A durometer serrated rubber contact wheel with one on one lands over which was entrained the coated abrasive belt. The workpiece was then reciprocated vertically through an 18 cm path at the rate of 20 cycles per minute, while a spring loaded plunger urged the workpiece against the belt with a load of 11.3 kg as the belt was driven at about 2050 meters per minute. After one minute elapsed grinding time, the workpiece holder assembly was removed and re-weighed, the amount of stock removed calculated by subtracting the abraded weight from the original weight, and a new, pre-weighed workpiece and holder were mounted on the equipment. The test endpoint was 45 minutes of grinding.

TEST PROCEDURE VI

Test Procedure VI was the same as Test Procedure V except that the workpiece was 304 stainless steel. Additionally, the test endpoint was when the amount of metal removed in a 60 second interval was one half the value of the amount of metal removed in the first 60 second interval of grinding of the comparative example.

Test Procedure VII

The coated abrasive was converted into an 8.9 cm by 335 cm endless belt, weighed and installed on a constant load surface grinder. The coated abrasive belt was entrained over a smooth 45 Shore A durometer rubber contact wheel that was approximately 36 cm in diameter. Approximately 1.27 cm of the endless belt was not supported by the contact wheel. The belt was rotated between 1900 to 1950 rpm. During abrading the non-supported coated abrasive tended to wrap around the edge of the contact wheel. A pre-weighed, 6061 aluminum tube which had an outer diameter of 8.9 cm with a wall thickness of 0.63 cm was mounted in a holder. The initial tube length was about 15 cm. The tube was positioned such that the end face of the tube was in contact at a 35° angle relative to 1.2 cm edge of the coated abrasive belt. During abrading, the load on the tube was 5 kg and the tube rotated at 11 rpm. After each minute, the test was stopped and the coated abrasive belt examined. If there was substantial shelling, i.e., substantial loss of the abrasive grain, the test was stopped. If there was not substantial shelling, the test continued. At the end of the test, the tube was weighed to determine the amount of aluminum abraded or cut. Additionally, the coated abrasive belt was also weighed and this weight was subtracted from the initial belt weight. This difference pertained to the relative amount of shelling, i.e., the amount of abrasive grain/binder lost.

EXAMPLES 1 THROUGH 3 AND COMPARATIVE EXAMPLE A

This set of examples compared various abrasive grain compositions. The abrasive grains were made according to the General Procedure I, except for the different levels of alumina powder added to the impregnating-/coating mixture. Approximately 1000 grams of the calcined particles were combined with 500 milliliters of the impregnating/coating mixture, the carrier fluid being deionized water. For Example 1, the impregnating/coating mixture additionally contained 10 grams of alumina powder. For Example 2, the impregnating-/coating mixture additionally contained 30 grams of alumina powder. For Example 3, the impregnating-/coating mixture additionally contained 50 grams of alumina powder. Comparative Example A did not contain any alumina powder in the impregnating/coating mixture. The alumina powder was purchased from Sumitomo, Japan under the designation "AKP50", and was approximately 0.4 micrometers in size. The abrasive grains were incorporated into fiber discs and were tested according to Test Procedures I, III, and IV. The test results can be found in Table 1, below, and all tests results were based upon a percent of the Comparative Example.

TABLE 1

| Example | Test Proc I Total cut, % of Comparative A | Test Proc III Total cut, % of Comparative A | Test Proc IV Total cut, % of Comparative A |
| --- | --- | --- | --- |
| 1 | 103 | 116 | 175 |
| 2 | 100 | 118 | — |
| 3 | 90 | 116 | 136 |
| Comparative A | 100 | 100 | 100 |

Note that the fiber discs tested according to Test Procedure IV were humidified at 70% relative humidity for one week prior to testing. Note also Example 2 was not tested under procedure IV. The tests (III and IV) indicate that under severe conditions, the coated grains (i.e., Examples 1, 2 and 3) performed better.

EXAMPLES 4 THROUGH 6 AND COMPARATIVE EXAMPLE A

This set of examples compared various abrasive grain compositions. The abrasive grains were made according to the General Procedure I, except for the different inorganic powders added to the impregnating/coating mixture. Approximately 1000 grams of the calcined particles were combined with 500 milliliters of the impregnating/coating mixture, the carrier fluid being deionized water. For Example 4, the impregnating/coating mixture additionally contained 10 grams of zirconium oxide powder purchased from Toya Soda Manufacturing Co. under the trade designation "TZ-3Y". The average particle size of the zirconia oxide was about 0.8 micrometers. For Example 5, the impregnating/coating mixture additionally contained 10 grams of titanium dioxide powder purchased from DuPont, Wilmington, Del., under the trade designation "Ti-Pure". The average particle size of the titanium oxide powder was about 0.5 micrometer. For Example 6, the impregnating/coating mixture additionally contained 10 grams of alumina powder. The alumina powder was the same as described above in Example 1. Of course comparative Example A, as indicated above, did not contain any inorganic powder in the impregnating-/coating mixture. The abrasive grains were incorporated into fiber discs and were tested according to Test Procedure III. The test results can be found in Table 2, below.

TABLE 2

| | Test Procedure III |
|---|---|
| Example | Total cut, % of Comparative A |
| 4 | 124 |
| 5 | 115 |
| 6 | 123 |
| A | 100 |

The abrasive grains from Examples 4 through 6 were also examined under a scanning electron microscope. The inorganic particles were autogenously bonded to the surface and approximately 90% of the surface area of the abrasive grain was covered with these particles.

EXAMPLES 7 THROUGH 9 AND COMPARATIVE EXAMPLE A

This set of examples compared various abrasive grain compositions. The abrasive grains were (except for comparative Example A as described above) made according to General Procedure II. Approximately 1000 grams of the calcined particles were combined with 500 milliliters of the aqueous-based impregnating mixture. After the mixing step and before drying, approximately 20 grams of an inorganic powder (described below) were sprinkled onto the calcined, impregnated particles. (Since the impregnated particles were wet, the inorganic powder would stick.) For Example 7, the inorganic particle was alumina. The alumina powder was the same as described above for Example 1. For Example 8, the inorganic particle was zirconium oxide. The zirconium oxide powder was the same as described above in Example 4. For Example 9, the inorganic particle was Al(OH)$_3$ which was purchased from the DuPont Company, Wilmington, Del., under the trade designation "Tri-Pore R960". The abrasive grains were incorporated into fiber discs and were tested according to Test Procedure III. The test results can be found in Table 3, below.

TABLE 3

| | Test Procedure III |
|---|---|
| Example | Total cut, % of Comparative A |
| 7 | 275 |
| 8 | 148 |
| 9 | 120 |
| A | 100 |

EXAMPLE 10 AND COMPARATIVE EXAMPLE B

This example compared various abrasive grain compositions. The abrasive grains were made according to General Procedure II. The ratio of the calcined particles to the impregnating mixtures was 1000 grams to 500 milliliters the carrier fluid comprising deionized water. After the mixing step and before drying, approximately 180 g of an alumina powder was sprinkled onto 12 kilograms of the particles. Since the particles were wet, i.e., essentially saturated, the alumina powder was bound to the particles in a manner similar to coating from dispersion. The alumina powder was calcined alumina (commercially available under the trade designation "A16SG" from Alcoa, Pittsburg Pa.) which had an average particle size 1.0 micrometer. Comparative Example B was made according to U.S. Pat. No. 4,881,951 (the impregnation method described), and contained by weight on an elemental basis 95.6% alumina, 1.1% La$_2$O$_3$, 1.1% Nd$_2$O$_3$, 1.1% MgO and 1.1% Y$_2$O$_3$. For this example the abrasive grains were screened to a grade 36 as described in the standard from American National Standard Institute B74.18. The abrasive grains were incorporated into fiber discs and were tested according to Test Procedure III. The test results can be found in Table 4, below.

TABLE 4

| | Test Procedure III |
|---|---|
| Example | Total cut, % of Comparative B |
| 10 | 160 |
| B | 100 |

EXAMPLE 11 AND COMPARATIVE EXAMPLE C

The abrasive grain from Example 10 was incorporated into a coated abrasive according to the General Procedure for Making an Endless Coated Abrasive Belt. The endless belt was tested according to Test Procedures V, VI, and VII. The test results can be found in Tables 5, 6 and 7.

The abrasive grain for Comparative Example C was a fused alumina zirconia commercially available from the Norton Co. under the trade designation "NorZon". The coated abrasive for Comparative Example C was made according to the General Procedure for Making a Coated Abrasive Endless Belt except that the abrasive grain weight was 760 g/m$^2$. The endless belt was tested according to Test Procedures V, VI, and VII. The test results can be found in Tables 5, 6, and 7, below.

TABLE 5

| | Test Procedure V | |
|---|---|---|
| Example | Final cut grams | Total cut % of Comparative C |
| 10 | 123 | 147 |
| Comparative C | 73.7 | 100 |

TABLE 6

| | Test Procedure VI | |
|---|---|---|
| Example | Final cut grams | Total cut % of Comparative C |
| 10 | 34 | 170 |
| Comparative C | 34.6 | 100 |

TABLE 7

| | Test procedure VII | |
|---|---|---|
| Example | Final cut grams | Total cut grams |
| 10 | 23.5 | 397 |
| Comparative C | 21 | 300 |

EXAMPLE 11 AND COMPARATIVE EXAMPLE D

The abrasive grains for this set of examples were made according to General Procedure I and incorporated into fiber discs. The fiber discs were tested according to Test Procedure II; the test results can be found in Table 8, below.

For Example 11 the impregnating/coating mixture contained of deionized water, lanthanum nitrate, magnesia nitrate and alpha alumina particles. 500 grams of this impregnating/coating mixture were combined with 850 grams of the calcined particles. The ratios in the impregnating mixture were selected such that the final sintered abrasive grain contained by weight on an elemental basis 97.5% alpha alumina, 1.75% lanthanum oxide, 0.75% magnesia and on the surface of the grit was about 1% alpha alumina particles. The alpha alumina particles had an average particle size of about 0.2 micrometer and were purchased from the Reynolds Alumina Company under the designation RC-HP-DBM.

The abrasive grain of Comparative Example D was made in the same manner as Example 11 except that the impregnating/coating mixture did not contain any alpha alumina particles.

TABLE 8

| Example | Test Proc. II Total cut, % of Comparative D |
|---|---|
| 11 | 111 |
| Comparative D | 100 |

In Test Procedure II, the abrasive grain of Example 11 exceeded that of Comparative Example D.

GENERAL PROCEDURE III FOR MAKING THE ABRASIVE GRAINS

Step A

The following were dispersed together using a high shear mixer, 26.7 parts of an aqueous dispersion of gamma FeOOH (4% $Fe_2O_3$), 69.8 parts of approximately 60° C. deionized water, 2.3 parts of technical grade nitric acid which was 70% concentrated, one part magnesium nitrate which was 11% solids on an oxide basis, and 28.5 parts alpha aluminum oxide monohydrate powder sold under the trade designation Disperal®, commercially available from Condea, Germany. The resulting sol was dried over a 24-hour period starting at about 100° C. and increasing the temperature to about 180° C. After drying, the sol was a friable solid that was then crushed and screened. The screened particles passed through a screen containing 1 mm openings but were retained on a screen containing 0.125 mm openings.

Step B

The screened particles were then placed in a closed system mixer (1.8 meter diameter mill) containing baffles. The mixer was rotated for fifteen minutes. The mixing action caused fine particles from the dried grits to break off and become attached to the surface of the base particle.

Step C

The screened particles were then fed into the end of a calciner to substantially remove bound volatiles. The calciner had a hot zone feed end temperature of 350° C. and an exit end temperature of 650° C. These particles are hereinafter designated calcined particles.

Step D

Into a 19-liter container was added approximately 0.5 kilogram of the calcined particles along with 250 milliliters of an impregnating mixture. The concentration of the magnesium nitrate was 11% based on an oxide basis. The concentration of the zirconium oxynitride was 26% based on an oxide basis. The container was vibrated to cause the metal salt and water from the impregnating mixture to be impregnated into the calcined particles by capillary action. After this impregnation step, the resulting particles were then fed into a rotary calciner that was about 15 cm in diameter, 1.1 meter long, hot zone temperature of 650° C. and residence time of 5 minutes.

Step E

The resulting grains exited from the calciner and were fed into a 1400° C. kiln as described above in "General Procedure I for Making the Abrasive Grain"). The product exited the kiln into room temperature air where it was collected in a metal container and allowed to cool to room temperature.

EXAMPLES 12 THROUGH 14 AND COMPARATIVE EXAMPLES E AND F

The abrasive grains for Examples 12 and 14 and Comparative Examples E and F were according to General Procedure III for Making the Abrasive Grains except for the following changes. For Examples 12 through 14 Steps A through E were completed. The impregnating solution for Example 12 consisted of magnesium nitrate, zirconium oxynitrate and deionized water. The impregnating solution for Example 13 consisted of magnesium nitrate and deionized water. The impregnating solution for Example 14 consisted of zirconium oxynitride and deionized water. Some of the zirconium oxynitride penetrated into the pores of the calcined grit, while other zirconium oxynitride remained on the surface of the calcined grit as a coating. For Comparative Example E Steps A through C and E were completed. Thus for Comparative Example F, the abrasive grains were not impregnated or tumbled. The formulations of the abrasive grains are listed in Table 9.

The abrasive grains for this set of Examples were screened to a grade 36 and incorporated into coated abrasive fiber discs. The fiber discs were tested according to Test Procedure I and the test results can be found in Table 10, below.

TABLE 9

| | Abrasive Grain Formulations | | | |
|---|---|---|---|---|
| Example | % $Al_2O_3$ (by weight) | % $Fe_2O_3$ | % MgO | % $ZrO_2$ |
| 12 | 93.5 | 0.5 | 3 | 3 |
| 13 | 96.5 | 0.5 | 3 | 0 |
| 14 | 96 | 0.5 | 0.5 | 3 |
| E | 99 | 0.5 | 0.5 | 0 |
| F | 99 | 0.5 | 0.5 | 0 |

TABLE 10

| | Test Procedure I* | | |
|---|---|---|---|
| Example | Initial cut, grams | Final cut, grams | Total cut, grams |
| 12 | 18.4 | 7.2 | 104.8 |
| 13 | 17.8 | 7.1 | 102.4 |
| 14 | 21.3 | 8.2 | 123.1 |
| E | 20.2 | 7.4 | 108.3 |

TABLE 10-continued

Test Procedure I*

| Example | Initial cut, grams | Final cut, grams | Total cut, grams |
|---|---|---|---|
| F | 22.6 | 6.5 | 110.8 |

*Except workpiece was 304 stainless steel instead of 1018 mild steel

What is claimed is:

1. A method of making ceramic abrasive grain characterized by each abrasive particle thereof being comprised of an alpha-alumina-based core with an exterior surface having a coating of particulate inorganic material autogenously bonded to the exterior surface, said method comprising the steps of:
   (a) providing a mass of porous first particles comprising alpha-alumina precursor material each particle of which is sinterable to an alpha-alumina-based abrasive grain;
   (b) mixing with said mass, in the presence of a liquid, mass of second particles having the same or different composition and are much finer than said first particles until the second particles are distributed over the exterior surface of each first particle, said second particles being capable of autogenous bonding to the exterior surface of said first particles upon sintering of said first particles; and
   (c) heating said particles to remove said liquid and then to sinter said first particles and cause autogenous bonding of said second particles to the exterior surface of each of said first particles.

2. A method according to claim 1 wherein said step (b) is selected from the group of steps consisting of:
   A.
      (i) adding said second particles to said liquid to provide a dispersion; and
      (ii) adding said dispersion to said porous first particles; and
   B.
      (i) adding said liquid to said porous first particles to provide liquid-impregnated particles; and
      (ii) mixing said second particles with said liquid impregnated particles.

3. A method according to claim 1 wherein said liquid includes modifier precursor.

4. A method according to claim 3 wherein said step of impregnating comprises impregnating with modifier precursor material selected from the group consisting of salts of: magnesium; zinc; cobalt; iron; nickel; zirconium; manganese; silicon; hafnium; chromium; yttrium; praseodymium; samarium; ytterbium; neodymium; lanthanum; gadolinium; cerium; dysprosium; erbium; titanium; and mixtures of two or more thereof.

5. A method according to claim 1 wherein said second particles are comprised of a material selected from the group consisting of: transitional alumina, alpha alumina, hydrated aluminas, yttria, magnesia, rare earth metal oxide material, zinc oxide, iron oxide, silica, silicate material, chrome oxide, titanium oxide, nickel oxide, yttrium alumina garnet, hexagonal rare earth aluminate, alumina zirconia, zirconia, silicon nitride, alumina oxynitride, titanium carbide, titanium nitride, silicon alumina oxynitride, silicon aluminum oxycarbide and combinations two or more thereof.

6. A method according to claim 1 wherein said porous first particles include metal oxide precursor material therein.

7. A method according to claim 1 wherein said porous first particles are calcined prior to step (b).

8. A method according to claim 2 wherein said step of adding the porous first particles to the second particles comprises mixing at least 50 ml of said liquid as a carrier fluid having second particles suspended therein for each 100 grams of porous first particles to be coated to provide a mixture.

9. A method according to claim 8 wherein said mixture comprises between about 0.01% and 30%, by weight, of said second particles, based on total weight of said second particles and carrier fluid.

10. A method according to claim 1 wherein said step (b) comprises mixing a sufficient amount of said second particles with said first particles to form a coating of said second particles covering at least 70% of the exterior surface area of said first particles.

11. A method according to claim 1 wherein said step (b) comprises mixing of a sufficient amount of said second particles with said porous first particles to form a coating thereon which has a thickness of about 0.5 to about 2.0 micrometers.

12. A method according to claim 1 wherein said second particles have an average size within the range of about 0.01 micrometer to about 20 micrometers and said mixing provides said particles which are filled with liquid to provide wet porous first pores therein at least 70% saturated with said liquid; wherein said adding involves adding dry said second particles to said wet first particles.

13. A method according to claim 1 wherein said first particles have an average size within the range of about 0.01 micrometer to about 20 micrometers and said mixing involves first mixing said first and said second particles to provide a mixture and then adding a sufficient amount of liquid to the mixture, with further mixing, to at least 70% saturate said porous first particles.

14. Ceramic abrasive grain prepared according to the process of claim 1.

15. Ceramic abrasive grain comprising:
   (a) sintered particles having an average particle size within the range of about 20 micrometers to about 4000 micrometers, each particle comprising:
      (i) an alpha-alumina-based core; and
      (ii) a coating of inorganic particulates autogenously bonded to said alpha-alumina-based core; said coating covering at least 70% of the surface area of the alpha-alumina-based core.

16. Ceramic abrasive grain according to claim 15 wherein said coating has a density up to about 80% of theoretical.

17. Ceramic abrasive according to claim 15 wherein said coating of inorganic particulates is between about 0.5 and about 10.0 micrometers thick.

18. Ceramic abrasive grain according to claim 15 wherein said coating of inorganic particulates comprises a region of at least 3 layers of particulates.

19. Ceramic abrasive grain according to claim 15 wherein said alpha-alumina-based core comprises alpha-alumina and metal oxide modifier.

20. Ceramic abrasive grain according to claim 15 wherein said sintered particles have a core which has a seeded microstructure.

21. Ceramic abrasive grain according to claim 15 wherein said coating comprises material selected from the group consisting of zirconia, alpha-alumina and mixtures thereof.

22. Ceramic abrasive grain according to claim 15 wherein said alpha-alumina-based core comprises a sintered reaction product of a rare earth metal oxide with alumina.

23. Ceramic abrasive grain according to claim 15 wherein said alpha-alumina-based core includes a central portion and an outer portion wherein:
   (i) said central portion includes therein a platelet product comprised of the reaction of a metal oxide modifier and alpha-alumina precursor; and,
   (ii) said outer portion comprises a seeded alpha-alumina-based microstructure.

24. An abrasive product comprising:
   (a) a binder; and
   (b) a plurality of abrasive grains secured within said abrasive product by said binder; said abrasive grains comprising the ceramic abrasive grain of claim 15.

25. An abrasive product according to claim 24 including a substrate to which said abrasive grains are bound by said binder.

26. An abrasive product according to claim 24 wherein said substrate is a non-woven fibrous mat.

27. An abrasive product according to claim 24 in the form of a wheel.

* * * * *

UNITED STATES PATENT AND TRADEMARK OFFICE
CERTIFICATE OF CORRECTION

PATENT NO. : 5,213,591

DATED : May 25, 1993

INVENTOR(S) : Celikkaya et al.

It is certified that error appears in the above-identified patent and that said Letters Patent is hereby corrected as shown below:

Column 7, line 30, "a Variety" should read --a variety--.

Signed and Sealed this

Nineteenth Day of July, 1994

Attest:

BRUCE LEHMAN

Attesting Officer

Commissioner of Patents and Trademarks